US011102932B2

(12) United States Patent
Hamilton

(10) Patent No.: US 11,102,932 B2
(45) Date of Patent: Aug. 31, 2021

(54) BALER WITH NIR SENSOR IN PLUNGER FACE

(71) Applicant: AGCO Corporation, Duluth, GA (US)

(72) Inventor: Kevin J. Hamilton, Newton, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 16/954,948

(22) PCT Filed: Nov. 5, 2018

(86) PCT No.: PCT/IB2018/058656
§ 371 (c)(1),
(2) Date: Jun. 17, 2020

(87) PCT Pub. No.: WO2019/123039
PCT Pub. Date: Jun. 27, 2019

(65) Prior Publication Data
US 2020/0375114 A1   Dec. 3, 2020

Related U.S. Application Data

(60) Provisional application No. 62/609,656, filed on Dec. 22, 2017.

(51) Int. Cl.
| A01F 15/04 | (2006.01) |
| A01F 15/08 | (2006.01) |
| A01F 15/10 | (2006.01) |

(52) U.S. Cl.
CPC ........ *A01F 15/042* (2013.01); *A01F 15/0841* (2013.01); *A01F 15/046* (2013.01); *A01F 15/10* (2013.01); *A01F 2015/102* (2013.01)

(58) Field of Classification Search
CPC .. A01F 15/042; A01F 15/046; A01F 15/0816; A01F 15/0841; A01F 15/10; A01F 2015/102; G01N 27/048; A01D 87/127
See application file for complete search history.

(56) References Cited

U.S. PATENT DOCUMENTS

| 4,918,910 A | 4/1990 | Sheehan et al. |
| 5,209,124 A * | 5/1993 | Graudejus ................ A24C 5/34 |
| | | 73/78 |

(Continued)

FOREIGN PATENT DOCUMENTS

| EP | 3 001 895 A1 | 4/2016 |
| WO | 2016/036749 A1 | 3/2016 |

OTHER PUBLICATIONS

European Patent Office, International Search Report for related International Application No. PCT/IB2018/058656, dated Jan. 18, 2019.

*Primary Examiner* — Debra M Sullivan
*Assistant Examiner* — Matthew Kresse

(57) ABSTRACT

A baling system operable to receive loose material, form the loose material into an individual charge, and compress the individual charge with one or more other charges to form a bale. The baling system includes a forming chamber and a plunger operable to move in a reciprocating manner within the forming chamber from a front-dead-center position in which a plunger face is furthest re) from the bale to a rear-dead-center position in which the plunger face contacts and compresses the bale. The system includes a feeder component operable to pre-compress the loose material to form the individual charge and then move the individual charge into the forming chamber, the feeder component including a feeder chute having a feeder chute outlet connected to the forming chamber. The feeder component is operable to pre-compress the loose material into the individual charge and then move the individual charge into the forming chamber for compression by the plunger into the bale. The system includes a moisture sensor operable to determine a moisture content of the individual charge in the feeder chute, wherein at least a portion of the moisture sensor is positioned in the plunger face. In one embodiment, (Continued)

Figure 1:
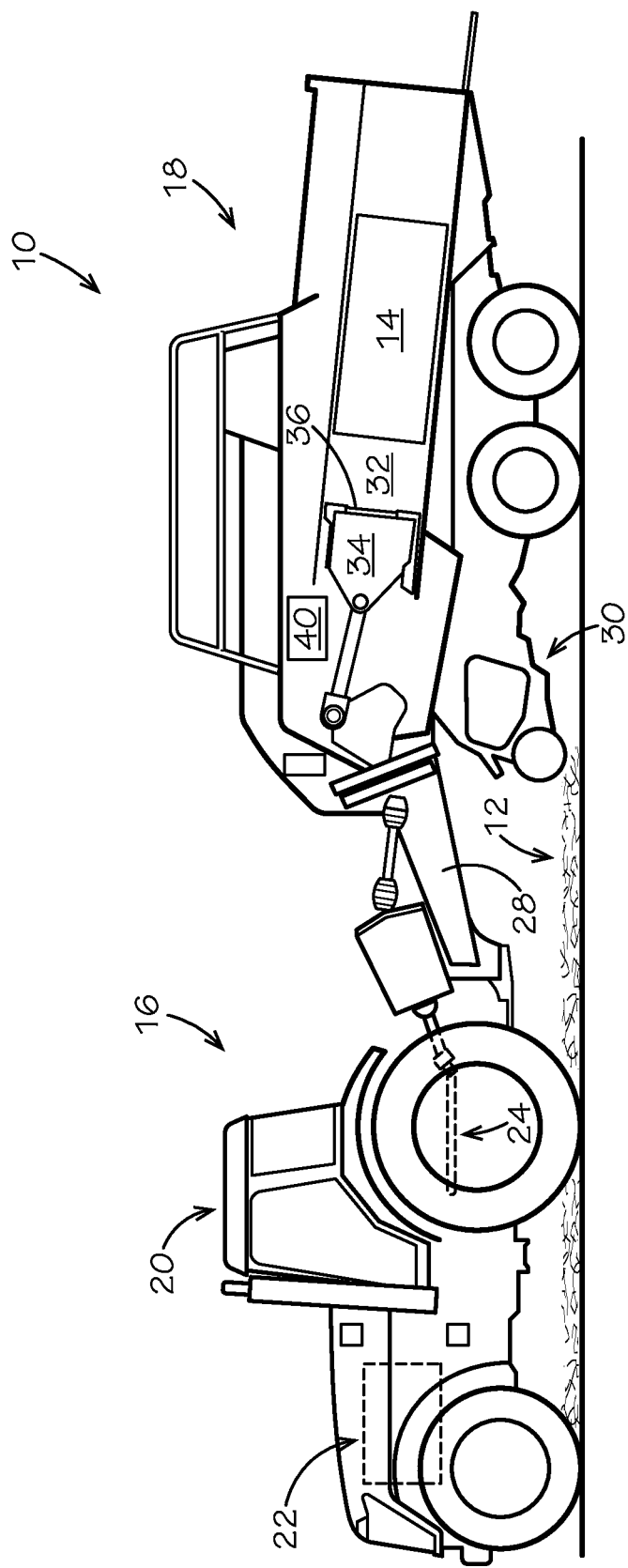

the moisture sensor is a near infra-red sensor operable to use near infra-red radiation to determine the moisture content.

6 Claims, 2 Drawing Sheets

(56) References Cited

U.S. PATENT DOCUMENTS

| | | | |
|---|---|---|---|
| 6,109,008 A | 8/2000 | Staheli | |
| 2013/0319263 A1 | 12/2013 | Roberts et al. | |
| 2017/0276623 A1* | 9/2017 | MacNeill | G01N 27/605 |

\* cited by examiner

BALER WITH NIR SENSOR IN PLUNGER FACE

BACKGROUND

Field of Invention

The present invention relates to systems and methods for controlling the operation of balers, and more particularly to a baler with a moisture sensor in the plunger face operable to determine a moisture content of the individual charge in the feeder chute.

Description of Related Art

Large square balers are used in the agricultural industry to create large substantially rectangular bales of crop material by moving over crop windrows to collect loose crop material, compress it, and form it into bales that are then tied and ejected. To that end, a baler is typically mechanically coupled with a tractor, and a power take-off (PTO) mechanism transfers power from the tractor's engine to drive the baler's operation. A rotary pick-up at the front of the baler collects the loose crop material and moves it into a feeder chute. Once the feeder chute is full, its contents are moved into a forming chamber. A reciprocating plunger compresses the crop material in the forming chamber into a growing bale. Once the bale reaches a predetermined length, which could be eight feet, it is tied and ejected through a discharge outlet to fall onto the ground behind the baler. The process then continues to create the next bale. For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler travels along the windrow to picks up the crop material and forms it into bales. Pickups of the baler gather the cut and windrowed crop material from the ground then convey the cut crop material into a bale-forming chamber within the baler. A drive mechanism operates to activate the pickups, augers, and a rotor of the feed mechanism.

It is known to use sensors to measure important properties, such as moisture content and nutritional value, of the crop material and in some cases, an amount of a preservative may be applied to the crop material based on the measured properties. It would is desirable to improve the accuracy of the data obtained by the sensors.

SUMMARY

Embodiments of the present invention solve the above-described and other problems and limitations by providing a baling system that measures the moisture content of each individual charge rather than the entire bale, One aspect of the invention is related to a baling system operable to receive loose material, form the loose material into an individual charge, and compress the individual charge with one or more other charges to form a bale. The baling system includes a forming chamber and a plunger operable to move in a reciprocating manner within the forming chamber from a front-dead-center position in which a plunger face is furthest from the bale to a rear-dead-center position in which the plunger face contacts and compresses the bale. The system includes a feeder component operable to pre-compress the loose material to form the individual charge and then move the individual charge into the forming chamber, the feeder component including a feeder chute having a feeder chute outlet connected to the forming chamber. The feeder component is operable to pre-compress the loose material into the individual charge and then move the individual charge into the forming chamber for compression by the plunger into the bale. The system includes a moisture sensor operable to determine a moisture content of the individual charge in the feeder chute, wherein at least a portion of the moisture sensor is positioned in the plunger face. In one embodiment, the moisture sensor is a near infra-red sensor operable to use near infra-red radiation to determine the moisture content.

In another aspect of the invention, the system measures the moisture content of the charge to which a preservative is applied, and thereby more accurately determines the correct amount of preservative, which minimizes both wastage of the preservative and risk of subsequent deterioration of the bale.

This summary is not intended to identify essential features of the present invention, and is not intended to be used to limit the scope of the claims. These and other aspects of the present invention are described below in greater detail.

DRAWINGS

Figure 2:
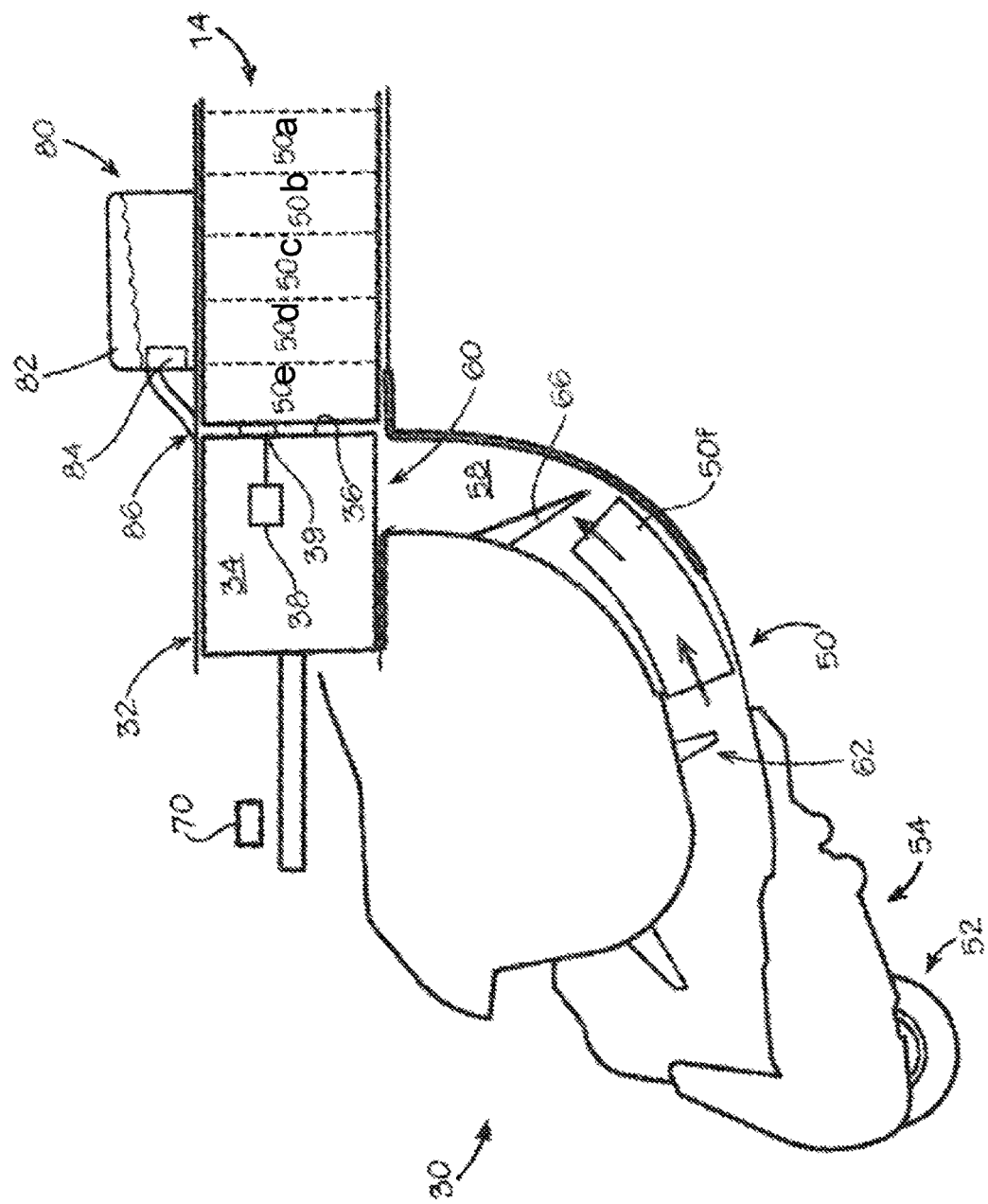

Embodiments of the present invention are described in detail below with reference to the attached drawing figures, wherein:

FIG. 1 is a cross-sectional elevation view of a baling system constructed in accordance with an embodiment of the present invention; and FIG. 2 is a cross-sectional elevation view of a feeder component of an embodiment of the baling system of FIG. 1.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention provides a baling system that measures the moisture content of each individual charge of pre-compressed crop material rather than an entire bale. Referring to FIGS. 1 and 2, an embodiment of the baling system 10 is operable to receive loose crop material 12, form it into an individual charge 50f, and compress the individual charge 50f with one or more other charges 50a-e to form a bale 14. The baling system 10 may broadly comprise a tractor 16 and a baler 18. The tractor 16 may include a cab 20 wherein an operator is located; an engine 22 operable to move the tractor 16; and a PTO 24 operable to transfer mechanical power from the engine 22 to the baler 18 or other connected machinery. The baler 18 may broadly comprise a frame 28 mechanically coupled with the tractor 16; a loose crop material receiving and stuffing component 30; a forming chamber 32; a plunger 34 having a plunger face 36; one or more moisture sensors 38; and an electronic control unit (ECU) 40.

The loose crop material receiving and stuffing component 30 may be operable to collect loose crop material 12 from the ground, pre-compress it into individual charges 50a-f (or "flakes"), and move the individual charges 50a-f into the forming chamber 32 for incorporation into the bale 14. The loose crop material receiving and stuffing component 30 may include a collector component 52 operable to pick-up the loose crop material 12 from the ground, a cutter component 54 operable to cut the collected loose crop material 12 into smaller pieces, and a feeder component 56 operable to pre-compress the loose crop material 12 to form the individual charge 50f and then feed the charge 50f into the forming chamber 32. The feeder component 56 may include a feeder chute 58 extending between the collector component 52 (or cutter component 54, if so equipped) and a feeder chute outlet 60 at the forming chamber 32 and through which the loose crop material moves from the former to the latter, one or more packing forks 62 operable to pack the collected loose crop material 12 into the feeder chute 58 in such a manner as to pre-compress the loose crop material 12 into the charge 50f, and a stuffer fork 66 operable to move the pre-compressed charge 50f into the forming chamber 32 via the feeder chute outlet 60.

The forming chamber 32 may be operable to receive the charge 50f so that it can be compressed by the plunger 34 into the bale 14. The forming chamber 32 may be substantially rectangular in shape to facilitate the compression and forming process. The plunger 34 may be operable to compress the charge 50f into the bale 14 by moving within the forming chamber 32. The plunger 34 moves in a reciprocating manner within the forming chamber from a front-dead-center position in which the plunger face 36 of the plunger 34 is furthest from the bale 14 to a rear-dead-center position in which the plunger face 36 is closest to the bale 14. More specifically, the plunger 34 repeatedly extends into the forming chamber 32 such that the plunger face 36 contacts and compresses the charges 50a-e that are already present therein, and retracts to allow the next charge 50f to enter the forming chamber 32 via the feeder chute outlet 60.

The one or more moisture sensors 38 are located in or adjacent the plunger 34 with a lens 39 of the moisture sensor 38 in or on the face 36 of the plunger 34. The moisture sensor 38 may be mounted with a dampening system to remove the acceleration source seen by the plunger 34 and therefore the attached sensor 38. The moisture sensors 38 may be operable to determine or provide information to the ECU 40 for determining a moisture content of the charge 50e while it is in the forming chamber 32. In one implementation, the moisture sensor 38 may be a near infra-red (NIR) scanner sensor operable to use near infra-red radiation to determine the moisture content of one or more points on the charge 50e. If the moisture content of more than one point is determined, then the results may be averaged to represent the moisture content of the entire charge 50e. In one embodiment, the near-infra-red sensor 38 is operable to determine a first moisture content at a first point on the individual charge 50e and a second moisture content at a second point on the individual charge 50e, with the first moisture content and the second moisture content averaged to represent the moisture content of the individual charge 50e.

In another implementation, the moisture sensor 38 may be a microwave sensor operable to use microwave radiation to measure an amount of free water in the charge 50e. The amount of free water in the charge 50e may be correlated with the mass of the charge 50e. The mass of the charge 50e may be estimated based on a weight of the charge 50e, and the weight of the charge 50e may be determined directly or calculated based on the weight of the bale 14 and the known number of charges 50a-e in the bale 14.

The baler 18 may have a position sensor 70 in order to determine the position of the plunger 34 as the plunger moves between the front-dead-center position and the rear-dead-center position. Any suitable position sensor 70 may be utilized to detect position of the plunger 34 within the forming chamber 32 and send corresponding signals to the ECU 40. For example, the position sensor 70 may be an angle sensor attached to a gear box and/or connecting rod system of the plunger 34 using sound engineering judgement.

In one or more embodiments, the moisture sensor 38 is triggered such that spectral readings are only taken by the moisture sensor 38 during a period of compression with the plunger 34 at rear-dead-center. Alternately, the moisture sensor 38 may use spectral filtering so that the ECU 40 only uses readings from the moisture sensor 38 when the plunger 34 is at rear-dead-center.

In one or more embodiments, the baler 18 may also have a preservative application component 80, which may be operable to apply a preservative to each of the individual charges 50a-f either before or after the plunger 34 compresses them into the bale 14. The preservative may in liquid, powder, or other form. The preservative application component 80 may include a reservoir 82 for holding the preservative, a pump module 84 for pumping the preservative out of the reservoir 82, and one or more spray nozzles 86 for releasing the pumped preservative into the forming chamber 32 so as to at least partially cover at least one surface of the introduced charge 50a-f. Migration of the preservative within the bale 14 over small distances helps to prevent deterioration of the quality of the bale 14.

In operation, the baling system 10 may function as follows. The collector component 52 of the loose crop material receiving and stuffing component 30 collects loose crop material 12 from the ground. If the baler 18 is so equipped, the cutter component 54 cuts the collected loose crop material 12 into smaller pieces. The one or more packing forks 62 of the feeder component 56 pack the loose crop material 12 into the feeder chute 58, wherein the feeder chute outlet 60 is covered by the plunger 34 so that packing the loose crop material 12 into the feeder chute 58 pre-compresses it to form the individual charge 50f. When the plunger 34 moves so as to uncover the feeder chute outlet 60, the stuffer fork 66 of the feeder component 56 moves the pre-compressed charge 50f into the forming chamber 32 via the feeder chute outlet 60. The one or more moisture sensors 38 located in or on the face 36 of the plunger 34 determine or provide information to the ECU 40 for determining the moisture content of the charge 50f while it is in the forming chamber 32.

Thus, the present invention provides advantages over the prior art, including that it measures the moisture content of each individual charge rather than the entire bale.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

The invention claimed is:

1. A baling system operable to receive loose material, form the loose material into an individual charge, and compress the individual charge with one or more other charges to form a bale, the baling system comprising:
 a forming chamber;
 a plunger operable to move in a reciprocating manner within the forming chamber from a front-dead-center position in which a plunger face is furthest from the bale to a rear-dead-center position in which the plunger face contacts and compresses the bale;
 a feeder component operable to pre-compress the loose material to form the individual charge and then move the individual charge into the forming chamber, the feeder component including a feeder chute having a feeder chute outlet connected to the forming chamber;
 wherein the feeder component is operable to pre-compress the loose material into the individual charge and then move the individual charge into the forming chamber for compression by the plunger into the bale; and
 a moisture sensor operable to determine a moisture content of the individual charge, wherein at least a portion of the moisture sensor is positioned in the plunger face, wherein the moisture sensor determines the moisture content of the individual charge after the individual charge is moved into the forming chamber.

2. The baling system as set forth in claim 1, wherein the moisture sensor is a near infra-red sensor operable to use near infra-red radiation to determine the moisture content.

3. The baling system as set forth in claim 2, wherein the near-infra-red sensor is operable to determine a first moisture content at a first point on the individual charge and a second moisture content at a second point on the individual charge, wherein the first moisture content and the second moisture content are averaged to represent the moisture content of the individual charge.

4. The baling system as set forth in claim 1, wherein the moisture sensor is a microwave sensor operable to use microwave radiation to determine the moisture content.

5. The baling system as set forth in claim 4, wherein the microwave sensor determines a free water content of the individual charge, and the free water content is correlated with a mass of the individual charge.

6. The baling system as set forth in claim 1, further comprising a control unit in communication with the moisture sensor and a preservative application component, and operable to receive an input signal from the moisture sensor regarding the moisture content of the individual charge when the charge is in the forming chamber, determine a correct amount of a preservative based on the moisture content, and send an output signal to cause the correct amount of the preservative to be applied to the individual charge when the individual charge is in the forming chamber.

* * * * *